Nov. 25, 1947.  A. R. WILLIAMS  2,431,439
LINE CLAMP
Filed Jan. 25, 1946
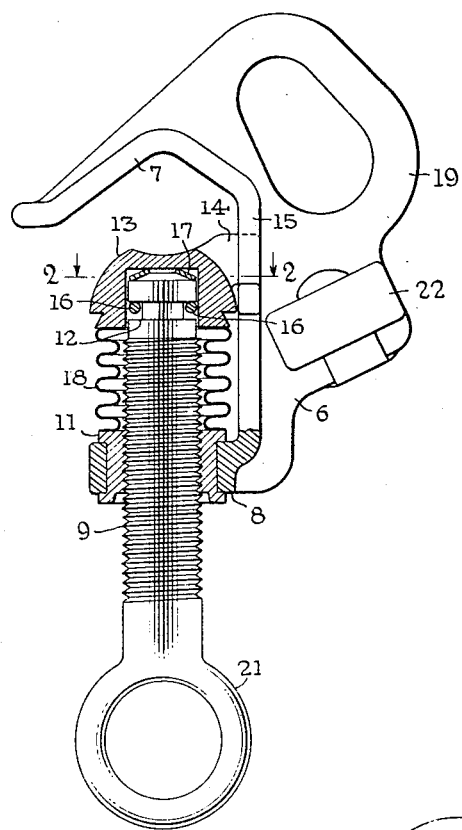
Fig.1
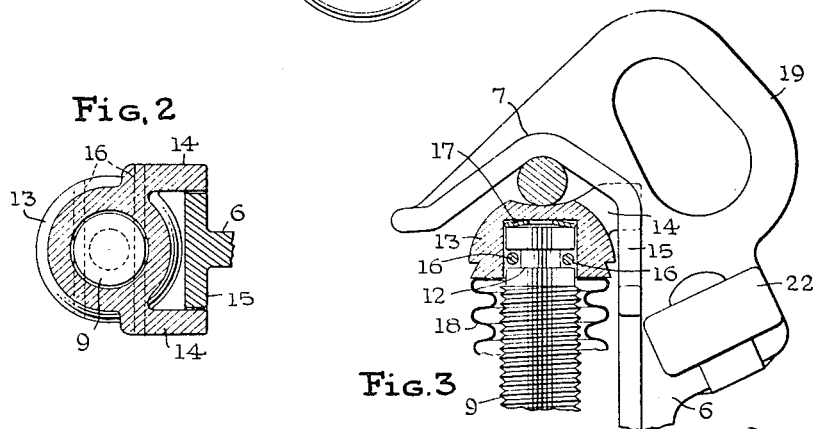
Fig.2
Fig.3
Inventor
Allison R. Williams
Attorneys Patented Nov. 25, 1947

2,431,439

UNITED STATES PATENT OFFICE 2,431,439

LINE CLAMP

Allison R. Williams, Yazoo City, Miss.

Application January 25, 1946, Serial No. 643,243

1 Claim. (Cl. 173—273)

The present invention relates to what are known as hot line clamps, i. e., detachable clamping connectors used to attach branch connections to live electric power lines, for example, power transmission lines or distribution lines.

Line clamps of this type are extensively used in connecting transformers, lightning arresters and the like. Such clamps as usually constructed have a tendency to mark or distort the line wire to which they are attached, and eventually they tend to work loose. For this reason it has been proposed to introduce a spring element in the clamp so that after the clamp has been set up there will be a residual follow-up clamping action sufficient in extent to maintain the clamp tight.

The problem is to produce a simple and compact construction in which high unit pressures can be attained throughout the necessary range of spring action. The present invention secures this result by making use of a plate spring.

In its preferred form the plate spring takes the form of an annulus of highly elastic steel (or other metal) which is given a dished or truncated conical configuration. Such a spring occupies a very small space and has a range of action almost equal to its depth. It is capable of developing very high unit pressures. In addition, it has the virtues of simplicity and long life.

Another advantage is that the spring mechanism can be combined with the swivel necessarily included in the clamp. As so combined, they are practically completely housed, and thus are protected from the weather.

As an optional feature, the invention may be combined with the structure of my Letters Patent 2,237,619, issued April 8, 1941. This patent discloses a metallic bellows arrangement which houses the clamp screw and retains a bath of lubricant, so that the screw is not only lubricated but protected. When combined with this protective structure, the spring and the swivel are similarly protected and lubricated.

The preferred embodiment of the invention will now be described by reference to the accompanying drawing, in which:

Fig. 1 is a view partly in side elevation and partly in section showing the complete clamp;

Fig. 2 is a fragmentary section on the line 2—2 of Fig. 1, showing how the movable clamping member is guided;

Fig. 3 is a fragmentary view similar to a portion of Fig. 1 and illustrating the positions assumed by the parts when the clamp is properly set up on a transmission line or the like.

The body 6 of the clamp has a grooved or hook-shaped clamping jaw 7 at its upper end and an arm 8 at its lower end, the arm being opposed to and spaced from the clamping jaw.

A clamping screw 9 is threaded in a bushing 11 fixed in the arm 8 with its upper end directed toward the jaw 7, so that turning of the screw in one or the other direction causes it to move toward or from jaw 7.

The upper portion of screw 9 is unthreaded and has at a short distance below the upper end an encircling groove 12. The upper end of the screw 9 enters and is rotatable in a cylindrical cavity formed in a clamping member 13 movable relatively to the body 6.

In a sense member 13 is supported and guided by screw 9 but it is also guided by body 6, at least to the extent that the body restrains it against rotary motion. Various arrangements to this end are possible, but in the illustrated embodiment two lugs 14 on the member 13 straddle a guide 15 on the body 6.

A swivel connection between the screw 9 and member 13 is afforded by pins 16 which are riveted in member 13 and pass through groove 12. The diameter of the pins is less than the width of the groove, so that limited relative axial motion between parts 9 and 13 is permitted, as well as unlimited relative rotary motion.

The extent of axial motion between parts 9 and 13 preferably is equal to or slightly less than the range of action of a spring 17 interposed between screw 9 and member 13.

Preferably, and as shown, the spring 17 is an annulus of spring steel plate deformed to a conical or dished configuration and interposed between the end of screw 9 and the end of the cavity in member 13. Such a construction, if closely fitted, houses the spring and swivel sufficiently to afford good protection from the weather.

The bellows of my prior patent are adaptable to the construction described. Thus, metal bellows 18 are sealed at one end to bushing 11 and at the other end to member 13. The bellows thus enclose the screw, and protect the screw, the swivel and the spring from the weather. A partial filling of graphited grease provides lubrication and further protection against corrosion.

The eye 19 in body 6 is the means by which the clamp is suspended while being attached and the eye 21 is the means by which the screw 9 is turned. Ordinary "hot-line tools" are used for these purposes. A branch line connector clip is represented at 22 and may take any preferred form.

The mode of attaching the hot-line clamp is the same as that heretofore used. The screw 9 is set up until the spring 17 is nearly completely flat. Thus, the parts assume the positions clearly illustrated in Fig. 3. As the clamp tends to work loose, either from deformation of the wire or because of wear, the spring provides for the necessary follow-up clamping effect.

The advantages of this annulus type of plate spring are its small dimension in the direction of the axis of the screw, its simplicity of form, its large range of action in proportion to its overall height and its remarkable resistance to fatigue failure. The spring, therefore, has qualities which adapt it particularly for use in a device of the character described.

While one embodiment has been described in great detail, this is intended to be illustrative. Modifications within the scope of the claim are contemplated.

What is claimed is:

A line clamp comprising a body having a grooved clamping jaw adapted to engage a line conductor and having an arm spaced from and opposed to said jaw; a clamp-actuating screw, threaded in said arm with one end directed toward said jaw so as to approach and recede from the jaw as the screw is turned; a movable clamping member constrained by the body to move without rotary motion toward and from the first jaw, said member having a socket in which the end of the screw is received; and a swivel and spring thrust connection housed within said socket and comprising a disc-like plate spring interposed between the screw and the movable clamping member and interengaging parts on the screw and said member arranged to permit relative axial motion approximately commensurate with the range of deflection of said spring and unlimited relative rotary motion.

ALLISON R. WILLIAMS.

REFERENCES CITED

The following references are of record in the file of this patent:

UNITED STATES PATENTS

| Number | Name | Date |
| --- | --- | --- |
| 2,237,619 | Williams | Apr. 8, 1941 |
| 2,016,749 | Mack | Oct. 8, 1935 |
| 2,120,447 | Tipsord | June 14, 1938 |
| 1,984,566 | Bodendieck | Dec. 18, 1934 |